INVENTOR.
MARLAND G CURTIS
BY
ATTYS.

Feb. 4, 1969 M. G. CURTIS 3,425,552
SAMPLE SCREENING PLANT
Filed Sept. 12, 1966 Sheet 5 of 5

INVENTOR.
MARLAND G. CURTIS
BY
ATTYS.

United States Patent Office 3,425,552
Patented Feb. 4, 1969

3,425,552
SAMPLE SCREENING PLANT
Marland G. Curtis, c/o Curtis Construction Company,
Box 106, Spokane, Wash. 99210
Filed Sept. 12, 1966, Ser. No. 578,532
U.S. Cl. 209—239
Int. Cl. B07d 13/00
6 Claims

ABSTRACT OF THE DISCLOSURE

A sample screening plant is described to permit mechanical screening and analysis of the relative size distribution of rock aggregate with maximum accuracy and testing uniformity. The screening plant includes a plurality of stacked screens that are resiliently mounted on a pivot frame with a plurality of corresponding holding hoppers positioned rigidly on the frame for receiving the outfeed from the corresponding screen. Each of the holding hoppers have a hydraulically operated gate that may be selectively operated to dump the rock aggregate from the respective holding hopper into a weighing hopper that receives and weighs the material.

---

This invention relates to a sampler screening plant for rock aggregate of the type used in bulk quantities for large concrete projects such as dams and highways. It permits mechanical screening and analysis of a substantial sample of material in a minimum amount of time, providing maximum accuracy and testing uniformity.

At present, the sampling and testing of aggregate is carried out by manual methods wherein a small sample of aggregate is screened and weighed by techniques similar to those used in a laboratory. This procedure is time consuming and requires skill on the part of the party utilizing it, permitting human error to creep into the process at times. It also is time consuming, and difficulty in a particular sample might not be detected until a time at which the quantity of unacceptable material produced subsequent to the prior test of material has grown quite large. The present apparatus provides a mechanical device for screening and weighing samples of aggregate in a short time. It eliminates human factors which revolve about the time and amplitude of shaking the screens and also provides ready adjustability to adapt the apparatus to proven degrees of accuracy.

It is a first object of this invention to combine, in a single apparatus, a device for screening an aggregate sample and for separately holding each screened sample in a hopper for weighing purposes, together with the necessary weighing machinery and transfer equipment for handling the samples coming into and going out from the screening plant. The entire apparatus is relatively compact and mechanically simple. It can be readily handled by a single man.

Another object of this invention is to provide a sample screening plant which can be built to handle a relatively large sample of aggregate, commonly one thousand pounds.

Another object of the invention is to provide an apparatus which is adjustably to provide a high degree of screening efficiency under variable conditions depending upon the nature and size of the aggregate being tested. Furthermore, the variations in vibration speed and incline of the screens is desirable to permit clearance of material lodged in the screens at the completion of a screening process.

These and other objects will be evident from the following disclosure, taken together with the accompanying drawings which disclose a preferred form of the apparatus. It is to be understood that this form of the device is presented only by way of example and that minor modifications could obviously be made without deviating from its basic scope and purpose.

Figure 1:
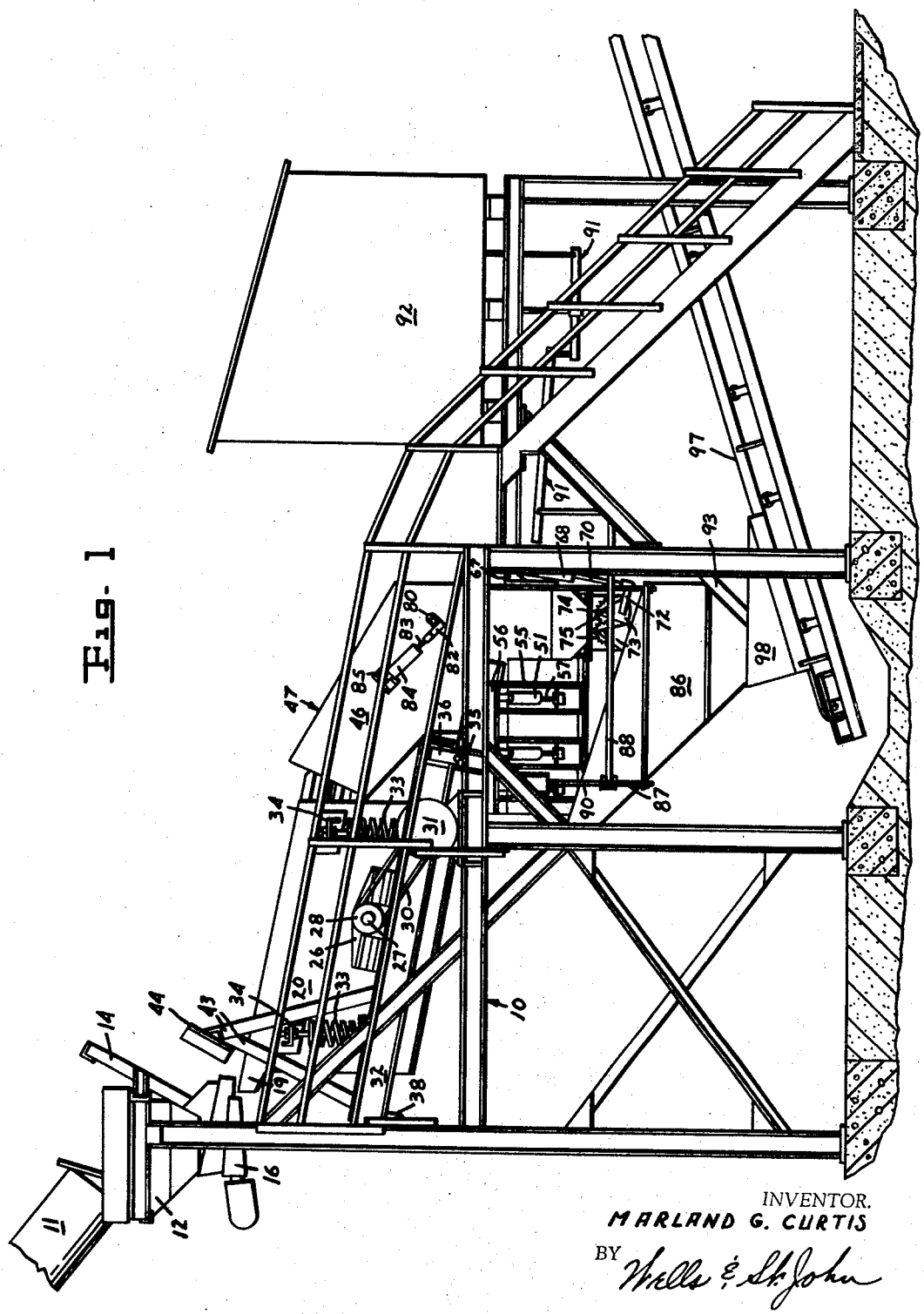
FIGURE 1 is a side elevation view of the screening plant.
Figure 3:
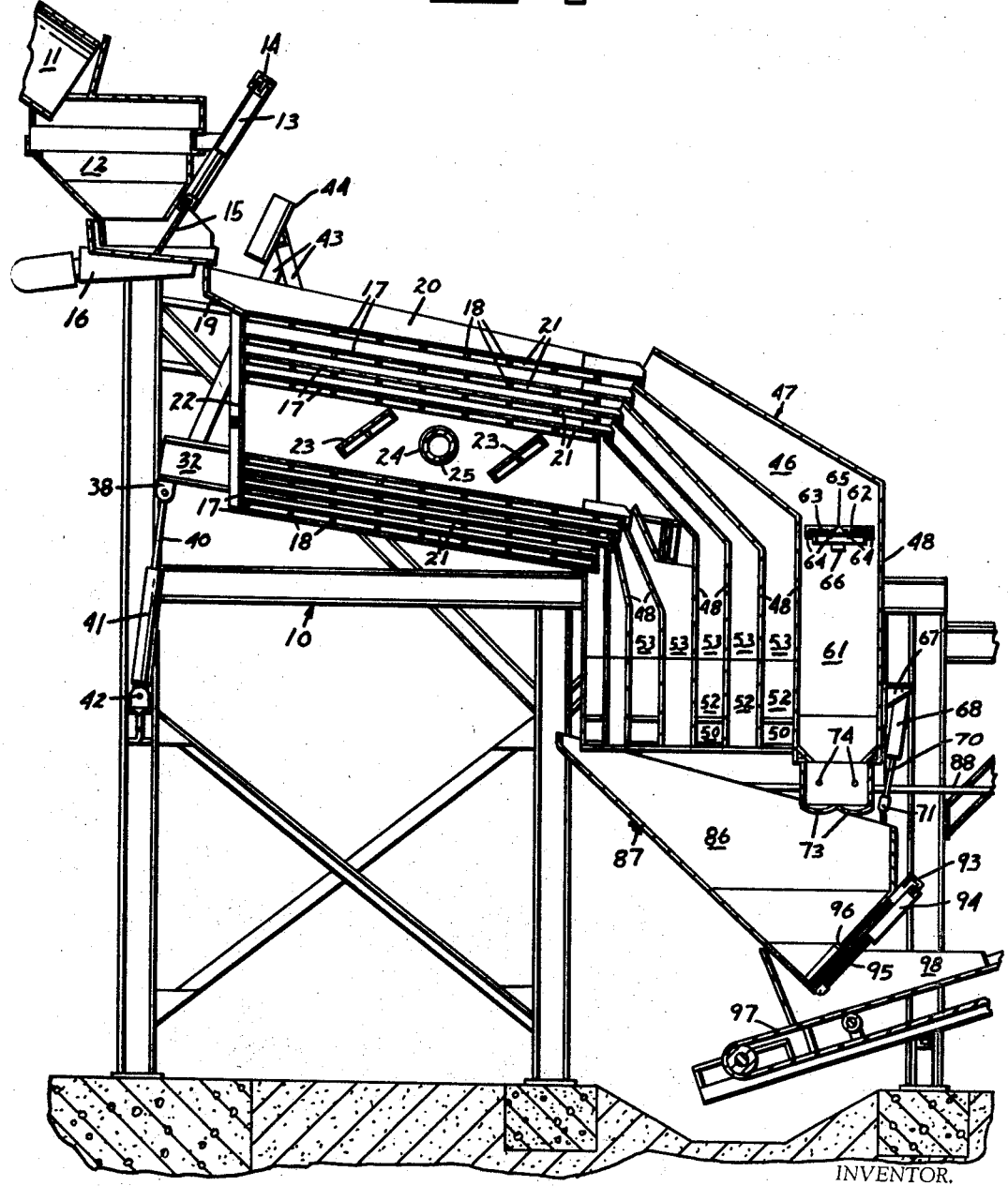
FIGURE 3 is an enlarged sectional view as seen along line 3—3 in FIGURE 2.

Referring now to the drawings and specifically to FIGURE 1, the gravel sample screening plant is supported on a frame generally designated as 10 constructed of steel I beams and posts. A feed chute 11 directs the flow of a gravel sample from a batch plant (not shown) to a feed control hopper 12 supported on frame 10. A hydraulic cylinder 13 is mounted in a frame 14 fixed to feed control hopper 12. Cylinder 13 selectively raises or lowers a gate 15 (FIGURE 3). The gate 15 regulates the flow of material into a vibrating feeder 16 carried on hopper 12.

Figure 6:
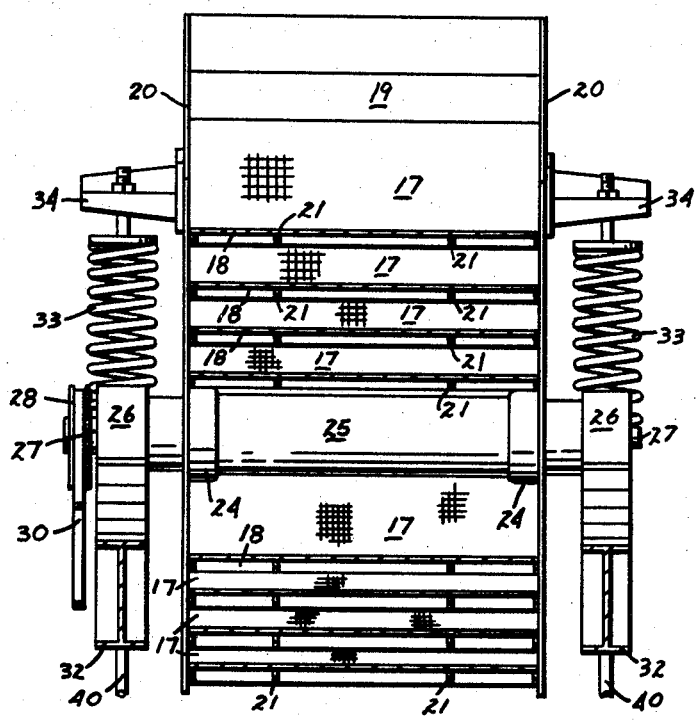
FIGURE 6 is an enlarged sectional view as seen along line 6—6 in FIGURE 4.

The vibrating feeder 16 delivers material samples to a series of deck screens 17 (FIGURE 3). Each deck screen 17 is supported on a series of evenly spaced transverse bars 18 fixed to vertical side walls 20. Further support of the deck screens 17 is provided by longitudinal bars 21 fixed between the transverse bars 18 (FIGURES 3 and 6). A vertical end plate 22, which connects the two vertical side walls 20, is provided with an outwardly extending lip 19 to better direct the gravel sample from the vibrating feeder 16 to the deck screens. The deck screens 17 are arranged to provide progressively finer screens from the top to the bottom of the series. A pair of transverse deflecting plates 23 are fixed between vertical side walls 20 to deflect rearwardly the particles falling from the screen above them to insure even screen utilization at all screen levels (FIGURE 3).

A pair of bearings 24 fixed to each side wall 20 serves to rotatably carry a transverse shaft 25 (FIGURES 3 and 6). The shaft 25 extends outwardly from the side walls 20 to bearings 26 that rotatably carry the shaft ends 27. Each shaft end 27 is fixed to and is slightly offset radially from the center of shaft 25 to provide an eccentric relationship between the two shafts. One of the shaft ends 27 has fixed to it a pulley 28 that carries a drive belt 30 powered by a drive motor 31. When motor 31 is operated, belt 30 rotates pulley 28, shaft ends 27, and shaft 25. As a result of the eccentric relation between shaft ends 27 and shaft 25, this rotation causes the forwardly sloping deck screens 17 to vibrate, thereby spreading and moving gravel through and along the deck screens 17. The motor 31 is preferably provided with a variable speed control to permit the variation of the number of vibrations per minute as required for different types of aggregate.

The bearings 26 which carry shaft 27 are supported on a pair of longitudinal beams 32 located on either side of the deck screens 17 (FIGURES 1, 2, 4 and 6). Each beam 32 has fixed to its top surface a pair of springs 33 that are adjustably fixed at their upper ends to brackets 34 extending perpendicularly outward from side walls 20. The springs 33 aid in supporting the deck screens 17 without transmitting their vibration to other parts of the apparatus.

Figure 2:
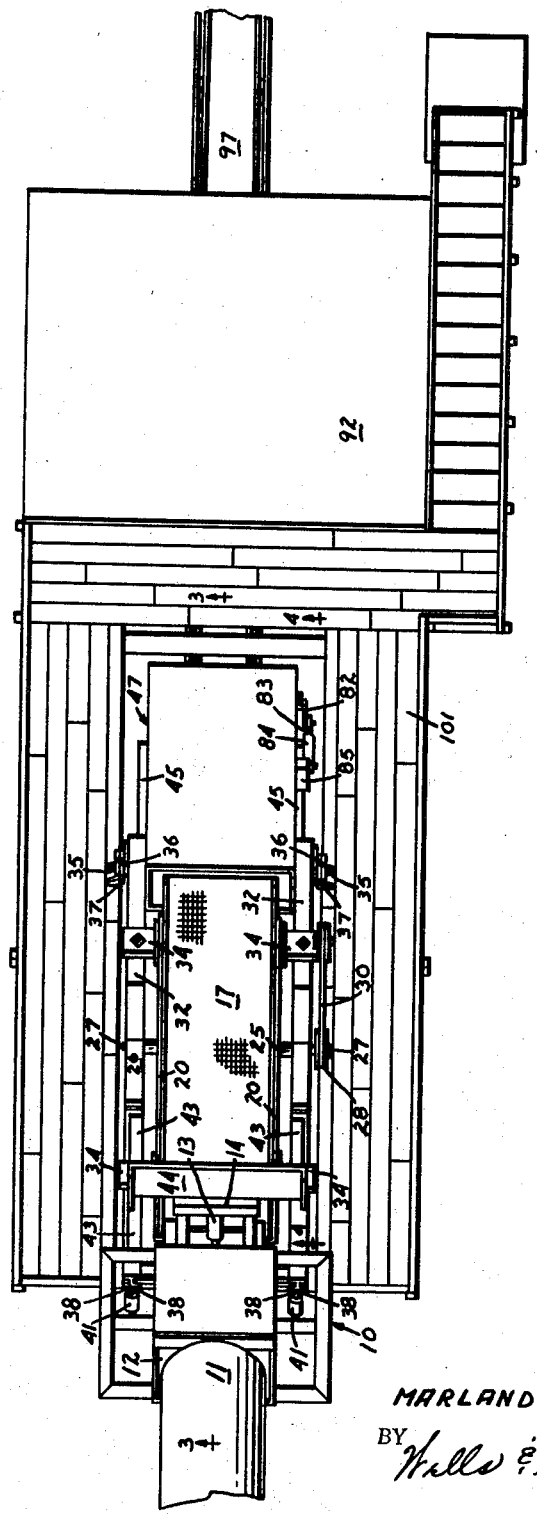
FIGURE 2 is a plan view of the screening plant as seen from the top of FIGURE 1.
Figure 4:
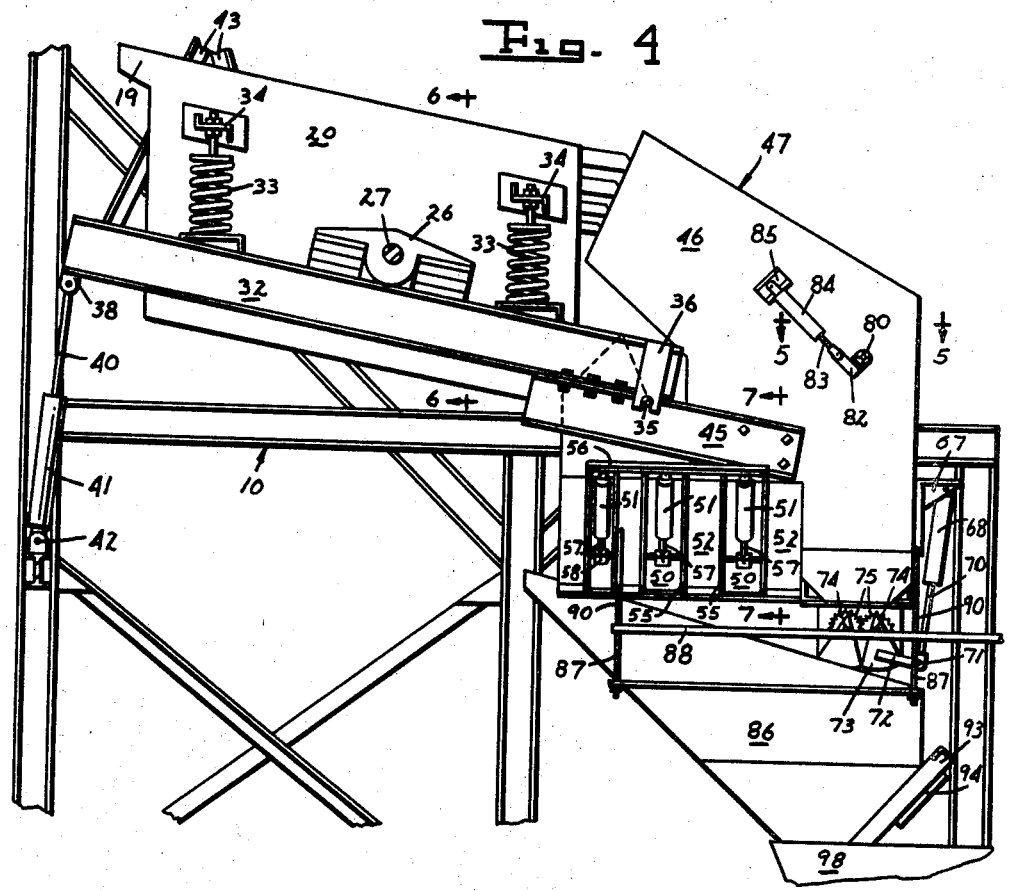
FIGURE 4 is an enlarged sectional view as seen along line 4—4 in FIGURE 2.

Each beam 32 has fixed to its forward end a bracket 36 with lower ends notched to conform to a horizontal shaft 35 on which which the beams 32 are pivotally carried (FIGURES 1, 2 and 4). The shaft 35 is fixed to a vertical plate 37 (FIGURE 1) secured to frame 10. The opposite end of each beam 32 has fixed to it a pair of vertical and downwardly projecting ears 38 (FIGURE 3) which are pivotally attached to the ends of cylinder rods 40 of hydraulic cylinders 41. The lower ends of hydraulic cylinders 41 are pivotally attached at 42 to frame 10.

The actuation of hydraulic cylinders 41 adjusts the angle of the deck screens 17 from 2° to 12° above the horizontal about pivot shaft 35 to accommodate different sizes and mixes of aggregates.

Also mounted on each beam 32 is a pair of angle irons 43 that provide support for a diversion plate 44 positioned transversely above the deck screens 17. When the deck screens 17 are in their lowest position of incline, the diversion plate 44 serves to divert the flow of aggregate from the vibrating feeder 16 onto the infeed end of the deck screens 17.

A pair of short channels 45 are bolted to the lower surfaces of beams 32 adjacent their forward ends and are respectively bolted to the vertical side walls 46 of a holding hopper 47 (FIGURE 4). This arrangement joins the holding hopper 47 rigidly to beams 32, so that it pivots about shaft 35 with the deck screens 17. The holding hopper 47 is divided into one large forward compartment and seven smaller compartments by means of transverse plates 48 fixed to vertical side walls 46 (FIGURE 3). The upper part of each compartment is inclined toward the deck screen 17 which will feed it the properly sized aggregate after it is separated by the screening process. The aggregate is moved from the infeed end of the deck screens 17 to the infeed ends of the holding compartments by the forward incline of the screens and by their vibrating action.

Figure 7:
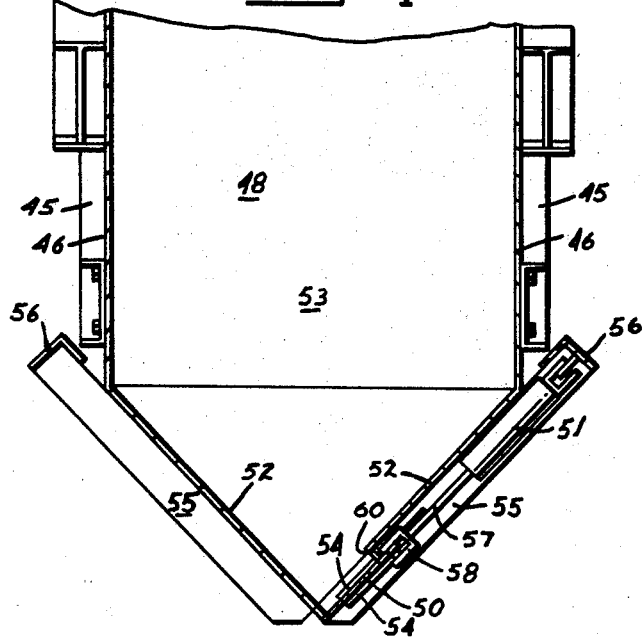
FIGURE 7 is an enlarged sectional view as seen along line 7—7 in FIGURE 4.

The lower end of each of the small compartments 53 has inclined side walls 52 to allow all of the aggregate to fall from the compartment once it is opened (FIGURE 7). One of the inclined side walls 52 of each compartment 53 has fixed to it a pair of vertical plates 55 which are connected at their upper ends by a bracket 56 (FIGURES 4, 7). The brackets 56 mount a hydraulic cylinder 51 provided with cylinder rods 57. A U-shaped bracket 58, fixed to the end of each cylinder rod 57, is attached to a gate 50 slidably carried on guides 54 fixed to each vertical plate 55 (FIGURES 4 and 7). When the hydraulic cylinder rod 57 is fully extended (as seen in FIGURE 7) the gate 50 closes an opening 60 in one of the side walls 52 and prevents aggregate from leaving the compartment 53. When hydraulic cylinder 51 is actuated, the gate is raised and aggregate is permitted to fall from the compartment 53. Each of the seven small compartments 53 of holding hopper 47 is closed by a gate 50 which is raised and lowered by a separate hydraulic cylinder 51. Three of the gates 50 and hydraulic cylinders 51 are located on one side of the holding hopper 47 and four are located on the opposite side of the hopper.

The large holding hopper compartment 61 has fixed to one of its transverse walls 48 a bracket 67 that pivotally carries hydraulic cylinder 68 (FIGURES 1, 3 and 4). The cylinder rod 70 of hydraulic cylinder 68 has pivotally connected to it at 71 an arm 72. The arm 72 is fixed to one of a pair of clam jaws 73 which are pivotally carried on shafts 74 fixed to either side of hopper compartment 61. The clam jaws 73 are connected by gears 75 fixed to each jaw on pivot shafts 74. When hydraulic cylinder 68 is actuated, the arm 72 is pulled upwardly and the jaws 73 pivot away from each other due to the meshing engagement of gears 75, thus allowing aggregate to fall from the hopper compartment 61.

Figure 5:
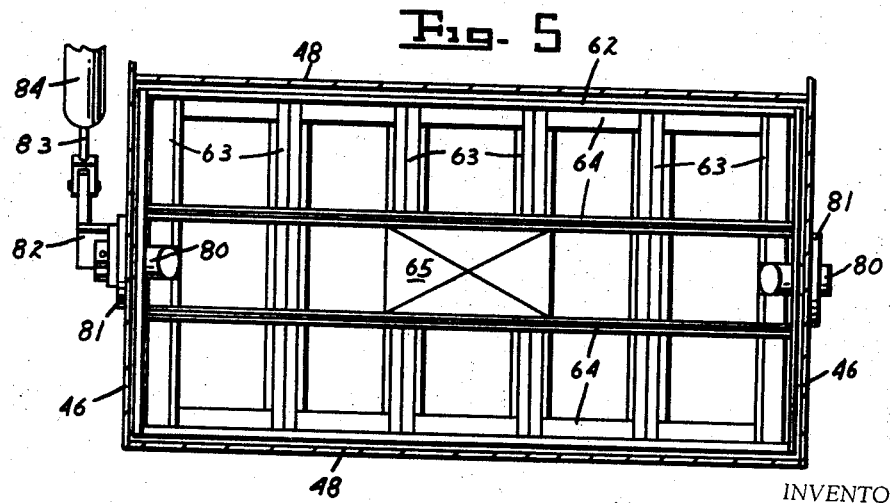
FIGURE 5 is an enlarged sectional view as seen along line 5—5 in FIGURE 4.

The large holding hopper compartment 61 is provided with a vibrator screen 62 at the top of its vertical portion (FIGURES 3 and 5). The vibrator screen is constructed of evenly spaced longitudinal members 63 and transverse members 64 which form a screen with large six inch square openings. A canopy 65 is mounted at the center of screen 62 to protect a conventional air vibrator 66 located under the canopy.

Fixed to either side of screen 62 are short rods 80 that are pivotally carried in bearings 81 fixed to side walls 46 of the holding hopper. A hydraulic cylinder 84 is pivotally attached to one of the side walls 46 by means of a bracket 85 (FIGURES 1 and 4). The cylinder rod 83 of hydraulic cylinder 84 is pivotally connected to a crank arm 82 which is fixed to one of the rods 80. When hydraulic cylinder 84 is actuated the vibrator screen 62 pivots in bearings 81 spilling the aggregate too large to pass through the screen.

Located directly below the holding hopper 47 is scale hopper generally designated as 86. The scale hopper 86 is supported at its four corners by vertical rods 87 which are pivotally connected to a pair of horizontal rods 88 located on either side of the hopper. The horizontal rods 88 are suspended from the frame 10 vertical rods 90. A series of beams and rods are connected to the horizontal rods 88 to form a conventional beam balance weighing system 91. The beam balance system is connected to a graduated scale dial located in the control house 92. The scale hopper 86 has attached to one side a frame 93 which mounts a hydraulic cylinder 94 which when actuated serves to raise and lower a gate 95. The gate 95 closes an opening 96 in the scale hopper 86 through which the aggregate passes after it has been weighed.

A waste conveyor 97 is located directly below scale hopper 86 and is supported on the frame 10. A three sided hopper 98 is attached to waste conveyor 97 to keep the aggregate on the conveyor as it falls from scale hopper 86. The waste conveyor delivers the weighed aggregate to a waste pile after it is released from the scale hopper 86.

All controls for operation of the sample screening plant are contained in the control house 92. The operation of the screening plant begins when a sample of aggregate are contained in the control house 92. The operation of enters feed control hopper 12 from a batch plant (not shown). The hydraulic cylinder 13 is then actuated, raising the gate 15 and allowing the aggregate to be spread on the deck screens 17 by the vibrating feeder 16. When the sample of aggregate falls on the deck screens 17, the largest aggregate is retained on the top deck screen and is gradually moved toward the holding hopper 47 due to the inclination and the vibration of the screens. Aggregate that is small enough falls through the top deck screen and continues to fall until it is retained by a screen with openings smaller than the aggregate size. The gauge of the deck screens 17 is progressively finer from top to bottom. The constant vibrating action of the deck screens 17 assists the passage of various sized aggregate through the screens, and provides more complete spreading and separation of the aggregate. The vibration of the deck screens 17 along with their incline cause the aggregate to be gradually moved forwardly toward holding hopper 47 while it is to be separated. At the end of the screening process, the motor 31 is set at its maximum speed and the deck screens 17 are inclined at their maximum angle to completely clear the screens of any aggregate that may have become lodged in the screens.

As the large aggregate that cannot pass through the top deck screen 17 enters the largest compartment 61 of holding hopper 47 aggregate particles larger than six inches square are held by vibrator screen 62. Aggregate smaller than six inches square passes through the screen 62 and is retained in the compartment by closed jaws 73. Once all aggregate has passed into the various holding hopper compartments, the jaws 73 are opened individually in succession by hydraulic cylinder 84. The aggregate retained by each holding hopper compartment is then weighed in scale hopper 86 by operation of the beam balance system 91. The weight of the aggregate is registered on the graduated dial in control house 92. After each sample of sized aggregate has been weighed, the hydraulic cylinder 94 is actuated, which raises gate 95 and allows the aggregate to fall onto waste conveyor 97. After all other weighing is completed, gate 95 is closed and the vibrator screen 62 is pivoted by actuation of hydraulic cylinder 68, dumping its load of aggregate into the scale hopper 86 where it is weighed and removed from the hopper.

One very important feature of the apparatus described above is the fact that the operator of the device can readily adjust the inclination of the deck screens 17 by utilization of hydraulic cylinders 41, which pivot the screens 17 and holding hoppers 47 in unison about the shaft 35. Before using the plant, it must be calibrated to match normally acceptable standards of testing carried out by manual or laboratory procedures. A sample of aggregate must be separated and weighed by manual methods and then fed through the apparatus described above, so that the results can be compared. By doing so successively, and by adjustment of the inclination of the deck screens 17 and the speed of rotation of the variable speed motor 31, the operator of the plant can match the laboratory test results and the test results of the mechanical testing plant. The inclination of the screens 17 can be noted, along with the rotational speed of motor 31, so that these factors can be duplicated each time that particular type of aggregate is being tested. Other types of aggregate used in a particular job might require different inclinations and different speeds of rotation to vibrate screens 17, but once the apparatus has been calibrated for a particular type of aggregate, the operator can instantly adjust the device prior to a testing procedure, duplicating the desired degree of accuracy and relating it to normally accepted manual methods. The versatility of the apparatus is apparent, since a single screening plant can quickly be adjusted to test anyone of several different aggregate mixes. Furthermore, at the completion of testing, the inclination of screens 17 can be made a maximum and the speed of motor 31 can be increased to dislodge any stones or particles trapped in the individual deck screens. Again, it is a simple matter to readjust the apparatus for the next batch of aggregate.

The entire testing process requires very little time and, since all of the steps are mechanical, can be carried out more promptly and with greater frequency than is possible when using manual procedures. Furthermore, the test results are tabulated immediately and production of aggregate can be adjusted or terminated if faulty sizing of particles is detected. The lag between production and testing is minimized, eliminating unnecessary waste which occurs when the testing procedure requires additional time, during which faulty production might continue.

Having thus described my invention, I claim:

1. In a sample screen plant for rock aggregate material:
   a rigid supporting framework;
   a pivotal frame pivotally mounted on the framework for movement about a horizontal axis;
   a plurality of sample screens resiliently mounted on said pivot frame in an upright stack with progressively finer screens from top to bottom, each screen being inclined downwardly perpendicularly to the horizontal pivot axis to an open outfeed end;
   a plurality of holding hoppers rigidly mounted on said pivot frame, each in open communication with the open outfeed end of a single corresponding sample screen for receiving the material from the open outfeed end, each holding hopper being provided with a selectively operable outlet;
   a weighing hopper supported on the framework beneath the selectively operable outlets of the holding hoppers for receiving and weighing the material discharged from the holding hoppers therefrom, said weighing hopper having a selectively operable outlet;
   a first power means mounted on said pivot frame and operatively connected to said sample screens for vibrating said screens;
   a second power means mounted on said framework and operatively connected to said pivot frame to pivot said pivot frame to position the screens at desired inclinations to the horizontal while the screens are being vibrated to direct the material that is too large to pass through each screen to the corresponding open feed end;
   a third power means supported on the framework and operatively connected to the selectively operable outlets of the holding hoppers to selectively open said outlets to dump material from said holding hoppers into the weighing hopper; and
   a fourth power means supported on the framework and operatively connected to the selectively operable outlet of the weighing hopper to open said outlet after the material is weighed.

2. In a sample screening plant as defined in claim 1 wherein the second power means adjusts the inclination of the sample screens between two degrees and twelve degrees from the horizontal.

3. In a sample screening plant as defined in claim 1 wherein the sample screens are resiliently mounted on the pivot frame by compression springs and wherein the first drive means includes an eccentric shaft rotatably journalled in a concentric bearing and a radially offset bearing.

4. In a sample screening plant as defined in claim 1 further comprising deflecting plates mounted transversely between sample screens to deflect material falling toward the upper end of the immediately lower screen.

5. In a sample screening plant as defined in claim 1 wherein the holding hopper corresponding with the outlet of the top sample screen contains a screen therein for separating the rock aggregate having a diameter greater than six inches from the rock aggregate having a diameter less than six inches.

6. In a sample screening plant as defined in claim 1 wherein the third drive means includes a plurality of hydraulic cylinders operatively connected to corresponding selectively operable outlets of the holding hoppers for selectively opening said outlets.

References Cited

UNITED STATES PATENTS

| 2,312,477 | 3/1943 | Pollitz | 209—329 |
| 2,782,926 | 2/1957 | Saxe | 209—239 X |
| 2,925,177 | 2/1960 | Troland | 209—490 X |
| 3,077,266 | 2/1963 | Plumb | 209—317 |
| 3,098,037 | 7/1963 | Tonjes | 209—237 X |

FOREIGN PATENTS 611,203  3/1935  Germany.

HARRY B. THORNTON, *Primary Examiner.*

R. HALPER, *Assistant Examiner.*

U.S. Cl. X.R.

209—260, 317